United States Patent
Prasad et al.

(10) Patent No.: US 9,779,239 B2
(45) Date of Patent: Oct. 3, 2017

(54) DETECTION OF MALICIOUS SOFTWARE BEHAVIOR USING SIGNATURE-BASED STATIC ANALYSIS

(71) Applicant: FUJITSU LIMITED, Kawasaki-shi, Kanagawa (JP)

(72) Inventors: Mukul R. Prasad, San Jose, CA (US); Wei Yang, Champaign, IL (US)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/658,204

(22) Filed: Mar. 15, 2015

(65) Prior Publication Data

US 2016/0267271 A1    Sep. 15, 2016

(51) Int. Cl.
G06F 12/14    (2006.01)
G06F 21/56    (2013.01)

(52) U.S. Cl.
CPC .......... *G06F 21/563* (2013.01); *G06F 21/564* (2013.01)

(58) Field of Classification Search
None
See application file for complete search history.

(56) References Cited

U.S. PATENT DOCUMENTS

| | | | | |
|---|---|---|---|---|
| 6,668,325 B1 * | 12/2003 | Collberg | ................. | G06F 21/14 713/194 |
| 7,870,610 B1 * | 1/2011 | Mitchell | ............. | G06F 12/1441 726/22 |
| 8,312,545 B2 | 11/2012 | Tuvell et al. | | |
| 8,332,945 B2 | 12/2012 | Kim et al. | | |
| 8,782,792 B1 * | 7/2014 | Bodke | ..................... | G06F 21/53 713/187 |
| 8,806,646 B1 | 8/2014 | Daswani et al. | | |
| 8,904,525 B1 | 12/2014 | Hodgman et al. | | |
| 8,918,881 B2 | 12/2014 | Bettini et al. | | |
| 9,323,931 B2 * | 4/2016 | Lukacs | ................. | G06F 21/566 |

(Continued)

OTHER PUBLICATIONS

L. Lu, Z. Li, Z. Wu, W. Lee, and G. Jiang. CHEX: statically vetting android apps for component hijacking vulnerabilities. In Proc. CCS, Oct. 2012.

(Continued)

*Primary Examiner* — Farid Homayounmehr
*Assistant Examiner* — Olanrewaju Bucknor
(74) *Attorney, Agent, or Firm* — Maschoff Brennan

(57) ABSTRACT

According to an aspect of an embodiment, a method may include determining a set of entity instances in a software program. Each entity instance may correspond to a program entity through which the software program performs an interaction with an external entity that is external to the software program. The method may also include determining an identity of each external entity. Additionally, the method may include determining a set of data-flow predicates and a set of control-flow predicates that are satisfied by the software program. Further, the method may include comparing the set of data-flow predicates and the set of control-flow predicates with a signature library that includes one or more malicious software signatures. The method may further include determining that the software program is malicious in response to the set of data-flow predicates and the set of control-flow predicates matching one or more malicious software signatures.

18 Claims, 7 Drawing Sheets

(56) References Cited

U.S. PATENT DOCUMENTS

| | | | | |
|---|---|---|---|---|
| 2005/0210275 A1* | 9/2005 | Homing | G06F 21/14 | 713/190 |
| 2007/0261120 A1* | 11/2007 | Arbaugh | G06F 21/57 | 726/26 |
| 2009/0070878 A1* | 3/2009 | Wang | G06F 21/554 | 726/24 |
| 2010/0199354 A1* | 8/2010 | Eker | G06F 21/14 | 726/26 |
| 2010/0333203 A1* | 12/2010 | Tsviatkou | G06F 21/566 | 726/23 |
| 2013/0227636 A1* | 8/2013 | Bettini | H04W 4/001 | 726/1 |
| 2013/0263271 A1* | 10/2013 | Xie | H04L 63/0236 | 726/24 |
| 2014/0007238 A1* | 1/2014 | Magee | G06F 21/577 | 726/24 |
| 2014/0040978 A1* | 2/2014 | Barton | H04L 63/20 | 726/1 |
| 2014/0075535 A1* | 3/2014 | Soffer | H04L 63/0227 | 726/13 |
| 2014/0090059 A1* | 3/2014 | Wang | H04L 63/1416 | 726/23 |
| 2014/0317735 A1* | 10/2014 | Kolbitsch | H04L 63/145 | 726/23 |
| 2014/0331280 A1* | 11/2014 | Porras | H04L 63/20 | 726/1 |
| 2015/0074807 A1* | 3/2015 | Turbin | H04L 63/1416 | 726/23 |
| 2015/0074810 A1* | 3/2015 | Saher | H04L 63/1416 | 726/23 |
| 2015/0135316 A1* | 5/2015 | Tock | G06F 21/566 | 726/23 |
| 2016/0094569 A1* | 3/2016 | Mondiguing | H04L 63/1416 | 726/24 |
| 2016/0094574 A1* | 3/2016 | Hsueh | G06N 7/005 | 726/23 |

OTHER PUBLICATIONS

W. Enck, P. Gilbert, B.-G. Chun, L. P. Cox, J. Jung, P. McDaniel, and A. N. Sheth. TaintDroid: An Information-Flow Tracking System for Realtime Privacy Monitoring on Smartphones. In Proc. OSDI, pp. 1-6, Jun. 2014.

A. Sabelfeld and A. C. Myers. Language-based information-ow security. IEEE J.Sel. A. Commun., 21(1):5-19, Jan. 2003.

A. Metwally, F. Emekci, D. Agrawal, and A. El Abbadi. Sleuth: Single-publisher attack detection using correlation hunting. Proc. VLDB Endow., 1(2):1217-1228, Aug. 2008.

A. Metwally, D. Agrawal, and A. El Abbadi. Detectives: Detecting coalition hit ination attacks in advertising networks streams. In Proceedings of the 16th International Conference on World Wide Web, WWW '07, pp. 241{250, New York, NY, USA, May 2007. ACM.

J. Crussell, R. Stevens, and H. Chen. Madfraud: Investigating ad fraud in android applications. In Proceedings of the 12th Annual International Conference on Mobile Systems, Applications, and Services, MobiSys '14, pp. 123{134, New York, NY, USA, Jun. 2014. ACM.

\* cited by examiner

DETECTION OF MALICIOUS SOFTWARE BEHAVIOR USING SIGNATURE-BASED STATIC ANALYSIS

FIELD

The embodiments discussed herein are related to detection of malicious software behavior using signature based static analysis.

BACKGROUND

Malicious software, commonly referred to as "malware," is often covertly deployed on devices to extract information stored on or input to the devices, as well as to reduce performance of the devices, among other things. Malicious software is often detected using a syntactic approach where code of a software program may be compared with code of a known malicious software program to determine whether at least a portion of the code of the software program matches the code of the known malicious software program. However, in some instances, syntactic detection may be avoided via simple changes to code such that it does not match that of the known malicious software program while also exhibiting substantially the same behavior.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include determining, from source code of a software program, a set of entity instances in the software program. Each entity instance in the set of entity instances may correspond to a program entity through which the software program performs an interaction with an external entity that is external to the software program. The method may also include determining, from the source code, an identity of each external entity associated with the set of entity instances. Additionally, the method may include determining, from the source code and based on the set of entity instances and the identity of each external entity associated with the set of entity instances, a set of data-flow predicates that are satisfied by the software program and that each indicate a data flow of information between two or more external entities through the software program. Moreover, the method may include determining, from the source code and based on the set of entity instances and the identity of each external entity associated with the set of entity instances, a set of control-flow predicates that are satisfied by the software program and that indicate control of behavior of the software program with respect to one or more external entities. Further, the method may include comparing the set of data-flow predicates and the set of control-flow predicates with a signature library that includes one or more malicious software signatures. In addition, the method may include determining that the software program is malicious in response to the set of data-flow predicates and the set of control-flow predicates matching one or more malicious software signatures included in the signature library.

The object and advantages of the embodiments will be realized and achieved at least by the elements, features, and combinations particularly pointed out in the claims.

Both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
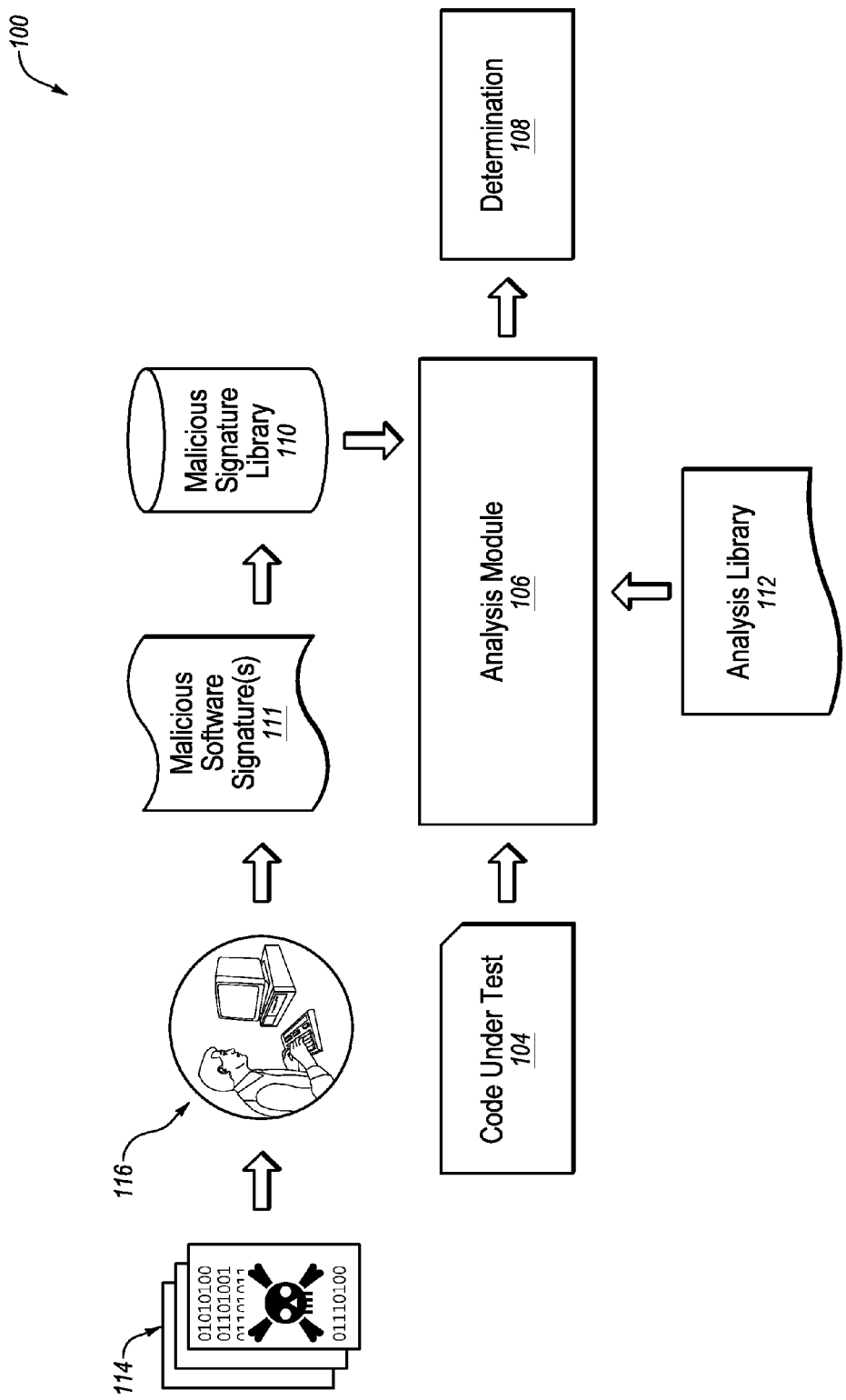
FIG. 1 is a diagram representing an example environment related to detecting malicious software.

Some embodiments described herein relate to methods and systems of detecting malicious software programs. As detailed below, the detection may be based on a static analysis of a software program to determine behavior of the software program that may be malicious in nature. In some embodiments, the static analysis may be used to detect malicious command-and-control (C&C) behavior of software programs.

Use of the term "C&C behavior" may refer to behavior in which a software program installed locally on a user's device, such as a mobile phone or a desktop computer, may perform operations based on commands issued by one or more remote computing systems such that the software program may be controlled by the remote computing systems. Each remote computing system, often called a command-and-control server, may in turn be controlled by a human controller, which may often be referred to as a botmaster. Using this set-up, which may often be referred to as a botnet, the botmaster may, in effect, exercise control over the operation of several thousand user devices (called bots), through the malicious software program, called a bot binary, installed on the user's device.

In particular, a set of entity instances within the software program may be determined from the source code of the software program. The entity instances within the software program may include program entities (e.g., variables or objects within the software program) through which the software program may interact with external entities that may be may be external to the software program. The external entities may include files that may be stored on or remote to a local device on which the software program may be loaded. Additionally or alternatively, the external entities may include web addresses or network locations (e.g., Uniform Resource Locators (URLs)) that may be used to establish communication between the software program and a remote computing system.

In some embodiments, identities of the external entities associated with the entity instances may be determined based on the source code of the software program. The identification of the entity instances and the corresponding identities of the eternal entities may allow for identification of C&C behavior that may involve the external entities.

Additionally, in some embodiments, a set of data-flow predicates that may be satisfied by the software program may be determined. In some embodiments, the data-flow predicates may indicate a flow of data ("data flow") between two or more external entities in which the flow of the data may be initiated by the software program. As detailed below, the data-flow predicates may be determined from the source code of the software program and based on the set of entity instances and the corresponding identities of the external entities in some embodiments.

In these or other embodiments, a set of control-flow predicates that may be satisfied by the software program may be determined. The control-flow predicates may indicate events or external entities that may control the behavior of the software program. As detailed below, the control-flow predicates may be determined from the source code of the software program and based on the set of entity instances and the corresponding identities of the external entities in some embodiments.

Moreover, in some embodiments, the set of data-flow predicates and the set of control-flow predicates may be compared with a signature library that may include one or more signatures of malicious software ("malicious software signatures"). The malicious software signatures may each include one or more data-flow predicates and/or one or more control-flow predicates that may correspond to one or more malicious software programs.

As such, it may be determined whether or not the software program is malicious by determining whether or not the set of data-flow predicates and the set of control-flow predicates matches one or more of the malicious software signatures in the signature library. For example, it may be determined that the software program is malicious in response to the set of data-flow predicates and the set of control-flow predicates matching one or more of the malicious software signatures in the signature library. In contrast, it may be determined that the software program may not be malicious in response to the set of data-flow predicates and the set of control-flow predicates not matching any of the malicious software signatures in the signature library.

Determining whether or not the software program is malicious in the manner described herein may be based on a behavioral (also referred to as "semantic") analysis of the software program with respect to which external entities may be involved, which events may trigger security sensitive behavior, and how security sensitive behavior is configured. In contrast, other methodologies used to determine whether or not a software program is malicious may merely analyze whether or not code of the software program exactly matches the code of malicious software programs (referred to as a "syntactic" analysis). Additionally, other methodologies may use a simplified semantic approach that does not involve determining which external entities may be involved with security sensitive behavior, which events may trigger security sensitive behavior, and how security sensitive behavior may be configured in the software program. The semantic approach described herein may provide for better detection of malicious C&C software as opposed to these other methodologies.

Embodiments of the present disclosure are explained with reference to the accompanying drawings.

FIG. 1 is a diagram representing an example environment 100 related to detecting malicious software, arranged in accordance with at least one embodiment described herein. The environment 100 may include an analysis module 106 configured to determine whether code under test 104 of a software program is malicious.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

In some embodiments, the software program may include an event-driven software program, such as a graphical user interface (GUI) based software program or a Web-based software program. In an event-driven software program, the flow of the software program may be determined by events such as user actions (e.g., mouse clicks, key presses), sensor outputs, or messages from other programs or threads of code.

The analysis module 106 may include code and routines configured to enable a computing device to determine whether or not the code under test 104 may be malicious. Additionally or alternatively, the analysis module 106 may be implemented using hardware including a processor, a microprocessor (e.g., to perform or control performance of one or more operations), a field-programmable gate array (FPGA), or an application-specific integrated circuit (ASIC). In some other instances, the analysis module 106 may be implemented using a combination of hardware and software. In the present disclosure, operations described as being performed by the analysis module 106 may include operations that the analysis module 106 may direct a corresponding system to perform.

As detailed below, the analysis module 106 may be configured to perform a series of operations with respect to the code under test 104 that may be used to determine whether the code under test 104 is malicious. For example, the analysis module 106 may be configured to determine entity instances included in the code under test 104 and identities of external entities that may correspond to the entity instances and that may interact with the code under test 104. Additionally or alternatively, the analysis module 106 may be configured to determine, based on the entity instances and corresponding external entity identities, a set of data-flow predicates and a set of control-flow predicates that may be satisfied by the code under test 104.

In some embodiments, the analysis module 106 may be configured to determine the entity instances, the set of data-flow predicates, and the set of control-flow predicates based on an analysis library 112, as explained in detail below. The analysis library 112 may include a signature specification language ("specification language") that may include a syntax used to specify signatures of malicious software. In addition the specification language may include syntax that may represent data-flow and control-flow predicates extracted from the code under test 104 by the analysis module 106. Specifically, the syntax may include a list entity types, action types, event types, and a list of data-flow predicates, and control-flow predicates, that may express C&C behaviors of malicious software as well as potential C&C behavior of the code under test 104.

In some embodiments, the specification language may include a list of one or more external entity types that may be associated with C&C behaviors. The entity types may include a set of abstract data types that may be used to define objects that may be implicated in the C&C behaviors. These abstract types may serve as a short-hand reference for a much larger set of concrete object types that may be instantiated in the actual software code in a specific programming language or software development platform. For example, in some embodiments, the list of external entity types may include one or more of the following: a "NetworkConnection" abstract type, a "File" abstract type, and an "SMSManager" abstract type.

The abstract type "File" may be used to refer to objects of any of several classes, such as "File," "InputStream," "OutputStream," etc., in the Java programming language, that may be used by the program to interact with an actual file on a filesystem. Similarly, the abstract type "NetworkConnection" may be used to refer to any of several concrete class types (such as "HttpUrlConnection" in Java) that may be used within a software program to communicate with an external network location, such as one defined by a URL. The choice of entity types to include in this list may be based on selecting broad classes of objects that may be commonly used for I/O operations by a software program. Additionally or alternatively, the choice of entity types may include specific classes of objects that may be susceptible to control or use by an external agent, such as a command-and-control server. The specific classes may be determined by analyzing the anatomy of known pieces of malicious software and the way they orchestrate their behavior.

The specification language may also include a list of one or more abstract action types. The action types may be used to refer to specific actions (implemented by specifics program functions) that may be included in software code and that may be associated with C&C behaviors. In some embodiments, the action types may include actions that denote salient operations that may be performed with respect to external entities. The determination of which actions to include in this list may be made based on analysis of software implementations of known specimens of malicious software and observing what operations they use to orchestrate C&C behavior, and specifically when communicating with external entities.

In some embodiments, these actions may be identified and represented as one of a few generic types of communication actions that a software program may conduct with an external entity, (e.g., I/O (input/output) actions). For example, in some embodiments, the list of action types may include one or more of the following: "Send" operations, "Receive" operations, "Read" operations, and "Write" operations. In some embodiments, the specification language may also include a list of one or more actions ("action list") that may include a corresponding designation of the action types for the actions in the action list along with a list of specific methods of specific object types that each kind of action may correspond to in a specific language, such as for example Java.

Additionally or alternatively, the specification language may include a list of one or more abstract event types that may be used to refer to a specific set of concrete events that may occur during the execution of the software code and that may be associated with C&C behaviors. The event types may include events that may trigger or initiate operations with respect to an external entity.

The determination of which events to include in the list of event types may be made based on the analysis of software implementations of known specimens of malicious software and observing what events are instrumental in the C&C behaviors executed by those malicious software and specifically in communication with external entities. Thus, in some embodiments, these events may be identified and represented as one of a few generic types of abstract event types that may occur during the execution of a software program.

For example, in some embodiments, the list of event types may include one or more of the following: a "SysUIEvent," a "StartEvent," and a "StopEvent." In the context of an Android® mobile platform, a "StartEvent" may refer to the event of starting an "Activity" component in an Android app, a "StopEvent" may refer to the event of stopping an "Activity" component in an Android® app. In addition, a "SysUIEvent" may refer to an event corresponding to a human user's interaction with the Android® app through its user-interface (UI), like the tap on a widget of the Android® app on a smartphone. In some embodiments, the specification language may also include a list of one or more events ("event list") that may include a corresponding designation of the event types for the events in the event list.

In these or other embodiments, the specification language may include a list of one or more data-flow predicates that may be used to describe the data-flow aspects of C&C behaviors. The data-flow predicates may indicate specific flows of information ("data flows") that may be performed through the execution of the software code and that may manifest a particular purpose of the data flows. In some embodiments, the types of data-flow predicates may include a "transmit" data-flow predicate, a "config" data-flow predicate, and an "initiate" data-flow predicate.

The "transmit" data-flow predicate may indicate a data flow included in software code where the software code may perform a transfer of data from a source external entity to a corresponding target external entity. In some embodiments, the "transmit" data-flow predicate may be configured as follows: "transmit ($E_{source}$, $E_{target}$)" where "$E_{source}$" may indicate the identity of the source external entity and "$E_{target}$" may indicate the corresponding target external entity. The specification language may also include the configuration of the "transmit" data-flow predicate in some embodiments.

The "config" data-flow predicate may indicate a flow of information in the software code, from a source external entity to a target external entity, for the purpose of configuring the behavior of the target external entity. The "config" data-flow predicate may also indicate an action included in the configuration in which the action may be an action of the target external entity whose behavior may be configured through this data flow. In some embodiments, the "config" data-flow predicate may be configured as follows: "config ($E_{source}$, $E_{target}$, A)" where "$E_{source}$" may indicate the identity of the source external entity, "$E_{target}$" may indicate the corresponding target external entity, and "A" may indicate the action. The specification language may also include the configuration of the "config" data-flow predicate in some embodiments.

The "initiate" data flow predicate may indicate an initiating external entity and a corresponding target external entity associated with a data flow. The initiating external entity may be an external entity from which instructions may be received by a software program corresponding to the software code. In some embodiments, the instructions may direct the creation of an entity instance that may be used by the software program to interact with the target external entity. In some embodiments, the "initiate" data-flow predicate may be configured as follows: "initiate ($E_{initiate}$, $E_{target}$)" where "$E_{initiate}$" may indicate the identity of the initiating external entity and "$E_{target}$" may indicate the corresponding target external entity. The specification language may also include the configuration of the "initiate" data-flow predicate in some embodiments.

Additionally or alternatively, the specification language may include a list of one or more types of control-flow predicates that may be associated with C&C behavior. The control-flow predicates may indicate events or external entities that may control or direct the behavior of the software program. In some embodiments, types of control-flow predicates may include a "trigger" control-flow predicate ("'trigger' predicate") and a "control" control-flow predicate ("'control' predicate").

The "trigger" predicate may indicate an event associated with the software program that may trigger behavior (e.g., one or more actions) of the software program that may involve its interaction with a target external entity. The "trigger" predicate may also indicate an action that may be ultimately triggered by the event and that may be performed on or by the target external entity through the software program. In some embodiments, the action may be security sensitive or relevant to execution of C&C behavior.

In some embodiments, the "trigger" predicate may be configured as follows: "trigger ($Ev_{trigger}$, $E_{target}$, A)" where "$Ev_{trigger}$" may indicate the triggering event, "$E_{target}$" may indicate the target external entity, and "A" may indicate the action performed on or by the external entity. Typically, this action may be a read or write type of action that may involve the transfer of data between the external entity and software program. The specification language may also include the configuration of the "trigger" predicate in some embodiments.

The "control" predicate may indicate a controlling external entity and a corresponding target external entity. The controlling external entity may include an external entity with which the software program may interact via a first interaction. The first interaction may direct a second interaction of the software program with the corresponding target external entity. The "control" predicate may also indicate an action that may be performed by the target external entity in response to the second interaction with the software program. As such performance of the action may be directed by the controlling external entity through the software program via the first interaction.

In some embodiments, the "control" predicate may be configured as follows: "control ($E_{control}$, $E_{target}$, A)" where "$E_{control}$" may indicate the identity of the controlling external entity, "$E_{target}$" may indicate the corresponding target external entity, and "A" may indicate the action. The specification language may also include the configuration of the "control" predicate in some embodiments.

In some embodiments, the analysis library 112 may also include a list of one or more entity initialization methods ("entity initialization list") that may include methods of software programs that may be used to instantiate or create entity instances within the program. In some embodiments, the entity initialization methods may include constructor or setter methods for different entity types. The entity initialization list may also include a corresponding designation of the entity types that may correspond to entity instances associated with the entity initialization methods included in the entity initialization list. In some embodiments, which constructor or setter methods to include in the entity initialization list may be based on which entity types may be included in the specification language.

For example, the methods "java.io.FileInputStream:<init>(java.io.File)" and "java.io.File:<init>(java-lang.String)" are constructor methods for "FileInputStream" objects and "File" objects respectively, in the Java language. Therefore, in some embodiments, they may be in included in the entity initialization list. As indicated above, "FileInputStream" and "File" may be concrete instances of the abstract entity type "File" and may be designated as such in the entity initialization list.

In some embodiments, the analysis library 112 may also include a list of one or more source methods of software programs ("source method list") and one or more sink methods of software programs ("sink method list") that correspond to data flows. The source methods may represent starting points for any of the data-flows that may be identified in the software program. In some embodiments, the source methods may include "read" methods for classes of standard I/O (input/output) objects such as files, network connections, etc. Some examples of source methods for the Java language may include <java.io.InputStream: int read(byte[ ] b)>, <java.io.FileInputStream: int read(byte[ ] b)>, and <java.io.AudioInputStream: int read(byte[ ] b)>. The sink methods represent termination points for any of the data-flows being identified in the software program.

In some embodiments, the sink methods may include "write" methods for classes of standard I/O (input/output) objects such as files, network connections, etc. Some examples of source methods for the Java language may include <java.io.ByteArrayOutputStream: void write(byte[ ] b)>, <java.io.FilterOutputStream: void write(byte[ ] b)>, and <java.io.FileOutputStream: void write(byte[ ] b)>.

The analysis module 106 may be configured to extract a set of data-flow predicates and a set of control-flow predicates that may be true in the code under test 104. The analysis module 106 may also be configured to compare them with one or more malicious software signatures 111 that may be included in a signature library 110 of the environment 100. As indicated above, the malicious software signatures 111 may each include one or more data-flow predicates and/or one or more control-flow predicates that may correspond to behavior of one or more malicious software programs. The analysis module 106 may be configured to do this to establish if the behavior of the code under test 104 is substantially similar to the behavior of malicious software that may be represented by the signatures stored in signature library 110.

In some embodiments, the malicious software signatures 111 may be created using the signature specification language based on an analysis of one or more known malicious software programs ("malware") 114. For example, data-flow predicates and/or control-flow predicates that may be satisfied by the malware 114 may be determined based on the entity types, action types, event types, data-flow predicates, and control-flow predicates that may be included in the signature specification language. The data-flow predicates and the control-flow predicates that may be determined for a particular instance of malware 114 may be used as a malicious software signature 111. In some embodiments, the malicious software signatures 111 may be determined by a security analyst 116 or by the analysis module 106.

The analysis module 106 may be configured to output a determination 108 based on the comparison in which the determination 108 may indicate a determination as to whether or not the code under test 104 is malicious. For example, the analysis module 106 may output the determination 108 as an indication that the code under test 104 is malicious in response to the set of data-flow predicates and the set of control-flow predicates matching one or more of the malicious software signatures in the signature library 110. As another example, the analysis module 106 may output the determination 108 as an indication that the code under test 104 may not be malicious in response to the set of data-flow predicates and the set of control-flow predicates not matching any of the malicious software signatures in the signature library 110.

Modifications, additions, or omissions may be made to FIG. 1 without departing from the scope of the present disclosure. For example, the environment 100 may include more or fewer elements than those illustrated and described in the present disclosure.

Figure 2:
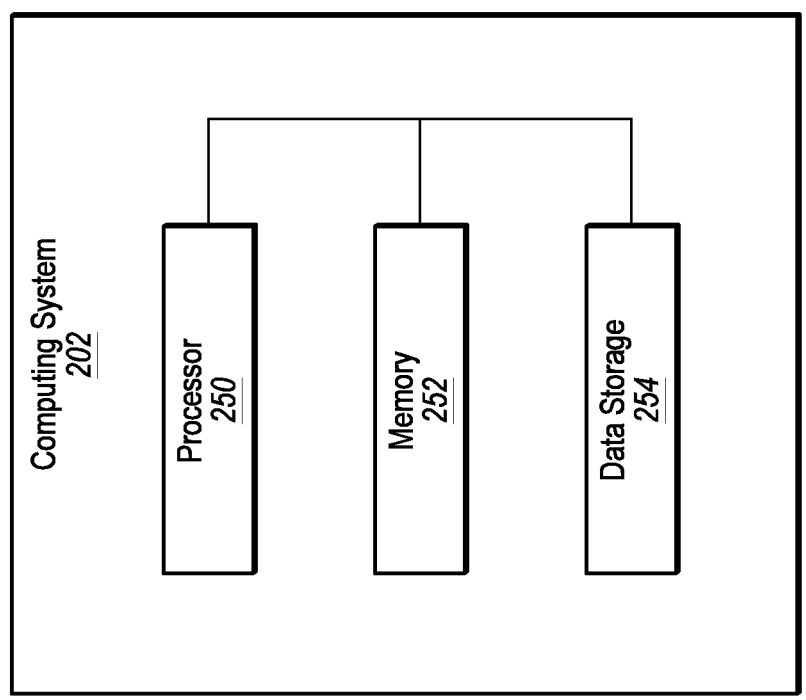
FIG. 2 illustrates an example computing system that may be configured to detect malicious software.

FIG. 2 illustrates a block diagram of an example computing system 202, according to at least one embodiment of the present disclosure. The computing system 202 may be configured to implement one or more operations associated with the analysis module in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to perform, individually or collectively, any number of operations described in the present disclosure. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the analysis module may be included in the data storage 254 as program instructions. The processor 250 may fetch the program instructions of the analysis module from the data storage 254 and may load the program instructions of the analysis module in the memory 252. After the program instructions of the analysis module are loaded into memory 252, the processor 250 may execute the program instructions such that the computing system may implement the operations associated with the analysis module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
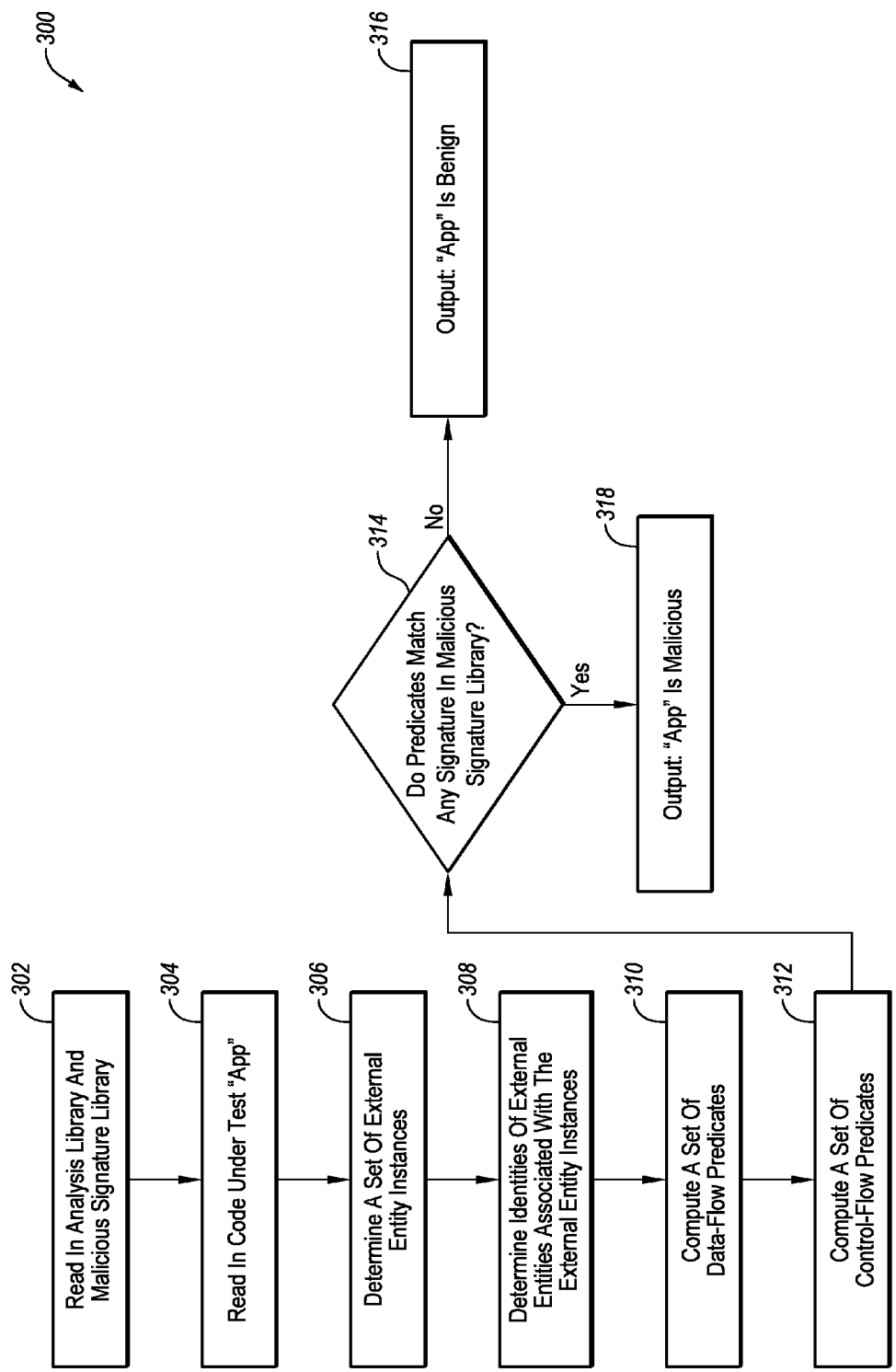
FIG. 3 is a flowchart of an example method of detecting malicious software.

FIG. 3 is a flowchart of an example method 300 of detecting malicious software, according to at least one embodiment described in the present disclosure. The method 300 may be performed by any suitable system, apparatus, or device. For example, the analysis module 106 of FIG. 1 or the computing system 202 (as directed by an analysis module) may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

The method 300 may begin at block 302, where a malicious signature library may be read. In some embodiments, the malicious signature library may be analogous to the malicious signature library 110 described with respect to FIG. 1. Additionally or alternatively, in some embodiments, an analysis library such as the analysis library 112 may be read at block 302.

At block 304, code under test "App" may be read. The code under test may be analogous to the code under test 104 of FIG. 1.

At block 306, a set of external entity instances included in "App" may be determined. At block 308, identities of the external entities that correspond to the external entity instances determined at block 306 may be determined. In some embodiments, the set of external entity instances and the corresponding identities of the external entities may be determined at blocks 306 and 308 according to a method 400 described in further detail below with respect to FIG. 4.

At block 310, a set of data-flow predicates that may be satisfied by "App" may be determined. In some embodiments, the set of data-flow predicates may be determined based on signature specification language that may be included in the analysis library, the set of external entity instances, and the identities of the corresponding external entities. In some embodiments, the set of data-flow predicates may be determined at block 310 according to a method 500 described in further detail below with respect to FIG. 5.

At block 312, a set of control-flow predicates that may be satisfied by "App" may be determined. In some embodiments, the set of control-flow predicates may be determined based on the analysis library, the set of entity instances, and the identities of the corresponding external entities. In some embodiments, the determination of the set of control-flow predicates may include determining a set of "trigger" predicates and/or determining a set of "control" predicates that may be satisfied by "App." In some embodiments, the set of "trigger" predicates may be determined according to a method 600 described in further detail below with respect to FIG. 6. Additionally or alternatively, the set of "control" predicates may be determined according to a method 700 described in further detail below with respect to FIG. 7.

At block 314, it may be determined whether the set of data-flow predicates and the set of control-flow predicates that are satisfied by "App" match one or more malicious software signatures (e.g., the malicious software signatures 111 of FIG. 1) in the malicious signature library (e.g., the malicious signature library 110 of FIG. 1). In response to the set of data-flow predicates and the set of control-flow predicates not matching any malicious software signatures included in the malicious signature library, an output that "App" is benign may be generated at block 316. In contrast, in response to the set of data-flow predicates and the set of control-flow predicates matching one or more of the malicious software signatures included in the malicious signature library, an output that "App" is malicious may be generated at block 318.

Accordingly, the method 300 may be used to make a determination as to whether a software program may be malicious or benign. Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
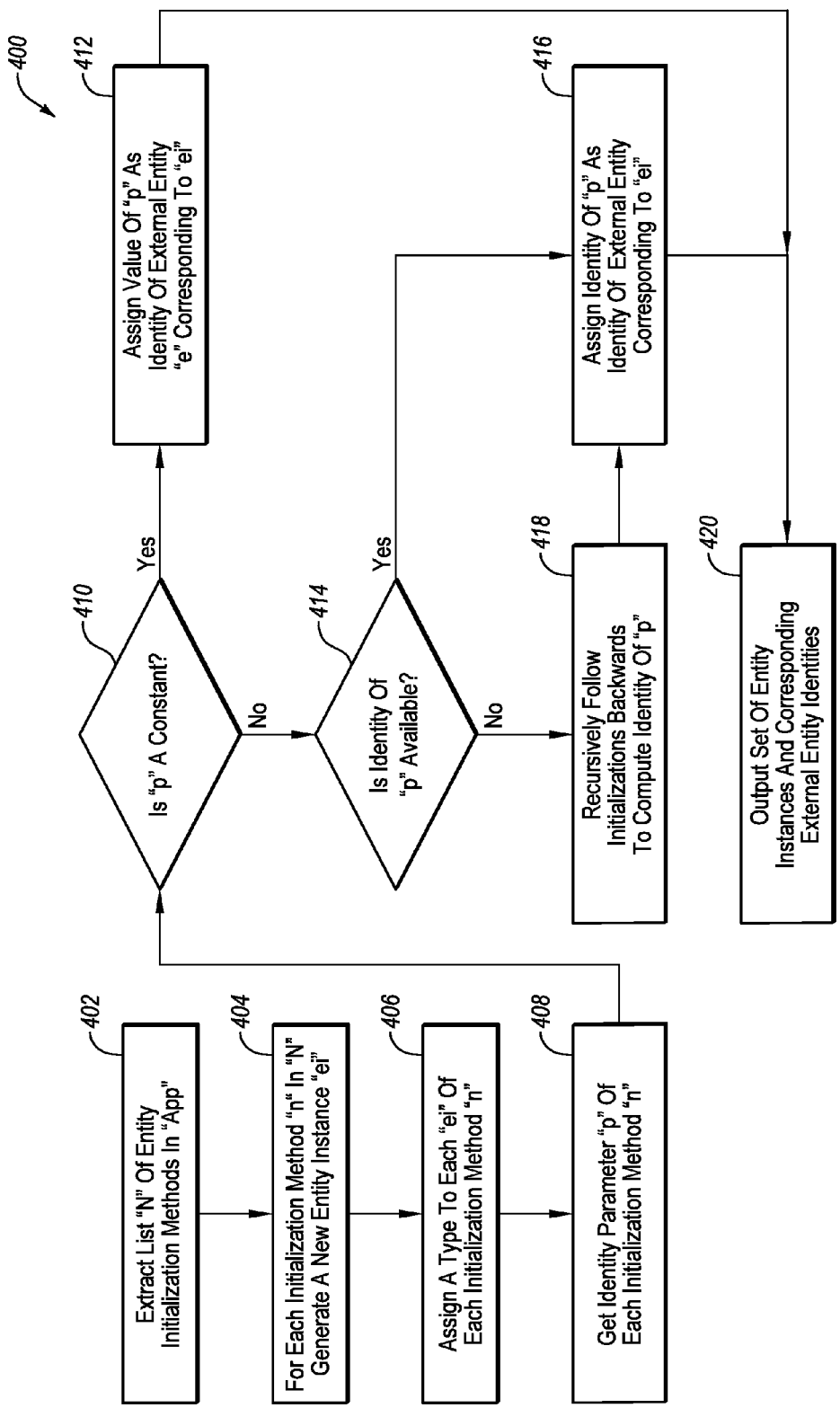
FIG. 4 is a flowchart of an example method of determining identities of external entities that interact with a software program.

FIG. 4 is a flowchart of an example method 400 of determining identities of external entities that interact with a software program, according to at least one embodiment described in the present disclosure. The method 400 may be performed by any suitable system, apparatus, or device. For example, the analysis module 106 of FIG. 1 or the computing system 202 (as directed by an analysis module) may perform one or more of the operations associated with the method 400. Additionally, the method 400 may be performed with respect to blocks 306 and 308 of method 300 described with respect to FIG. 3 in some embodiments. In the present disclosure, the method 400 is described with respect to the code under test "App" described with respect to FIG. 3. Although illustrated with discrete blocks, the steps and operations associated with one or more of the blocks of the method 400 may be divided into additional blocks, combined into fewer blocks, or eliminated, depending on the desired implementation.

The method 400 may begin at block 402, where a list "N" of instances of entity initialization methods "n" included in the source code of "App" may be extracted from "App." In some embodiments, all the entity initialization methods may be extracted from "App." In some embodiments, the list "N" of entity initialization methods of "App" may be determined from an entity initialization list "M" that may be included in the analysis library, which may be read in at block 302 of FIG. 3. For example, the source code of "App" may be parsed and compared with the entity initialization list "M" of the analysis library. In response to a particular method of "App" matching a particular entity initialization method "m" of the entity initialization list "M" of the analysis library, the particular method may be added to the list "N" as an entity initialization instance "n."

At block 404, an entity instance "ei" may be generated for each entity initialization method instance "n" that may be included in the list "N." The entity instances may each include a name for a particular object that may be initialized by the corresponding entity initialization method instance. In some embodiments, the entity instances "ei" may be included in a set "EI" of entity instances.

At block 406, an entity type may be assigned to each of the entity instances "ei." In some embodiments, the entity types may be determined based on the entity initialization list of the specification language. For example, a particular entity instance "ei" may be generated for a particular entity initialization method instance "n" in the list "N" at block 404. In addition, the particular entity initialization method instance "n" may correspond to a particular entity initialization method "m" that may be included in the initialization list "M." Furthermore, a particular entity type may be correlated with the particular entity initialization method "m" in the initialization list "M." The particular entity type may in turn be assigned to the particular entity instance "ei" that corresponds to the particular initialization method "n" because the particular entity initialization method "n" may correspond to the particular entity initialization method "m."

The entity type may be used in the matching of predicates that may be performed at block 314 of the method 300 of FIG. 3, in some embodiments. For example, the matching of data-flow predicates and control-flow predicates that may be satisfied by "App" with data-flow predicates and control-flow predicates that may be included in the malicious signature library at block 314 may include matching the entity types associated with the predicates.

At block 408, an identity parameter "p" may be obtained from each entity initialization method instance "n" that may be included in the list "N." The identity parameter may define the identity of the external entity with which an object may be initialized by the corresponding entity initialization method instance.

Note that blocks 410, 412, 414, 416, and 418 described in the present disclosure may be performed with respect to each identity parameter "p" that may be obtained at block 408. As such, reference to an identity parameter "p" with respect to blocks 410, 412, 414, 416, and 418 may refer to any one of the identity parameters "p" obtained at block 408.

At block 410, it may be determined whether or not the identity parameter "p" is a constant using any suitable technique. When the identity parameter "p" is a constant, the method 400 may proceed to block 412. When the identity parameter "p" is not a constant, the method 400 may proceed to block 414.

At block 412, a value of the identity parameter "p" may be assigned as the identity of an external entity "e." The identity of the external entity "e" may also be linked with the entity instance "ei" that may correspond to the entity initialization method "n" from which the identity parameter "p" may be obtained. Following block 412, the method 400 may proceed to block 420.

At block 414, it may be determined whether or not the identity of the identity parameter "p" is available. In some instances, the identity parameter "p" may have been previously determined with respect to another entity initialization method such that it may be available for the current entity initialization method. When the identity of the identity parameter "p" is available, the method 400 may proceed to block 416. When the identity of the identity parameter "p" is not available, the method 400 may proceed to block 418.

At block 416, an identity of the identity parameter "p" may be assigned as the identity of the external entity "e." The identity of the external entity "e" may also be linked with the entity instance "ei" that may correspond to the entity initialization method "n" from which the identity parameter "p" may be obtained. Following block 416, the method 400 may proceed to block 420.

The identity parameter "p" may not be identifiable in some instances because it may be a variable that may refer to one of several possible external entities. As such, at block 418, the entity initialization method "n" may be followed backwards to determine the entity initialization method that it may depend on, and this may be performed recursively until an identity for the identity parameter "p" may be available from a previous determination or determined based off a constant. When the identity for the identity parameter "p" is available, the method 400 may proceed to block 416.

At block 420, the set "EI" of entity instances may be output. In addition, the external entity identities and their corresponding links to the entity instances "ei's" included in the set "EI" of entity instances may be output at block 420.

Accordingly, the method 400 may be used to determine identities of external entities that interact with a software program. Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
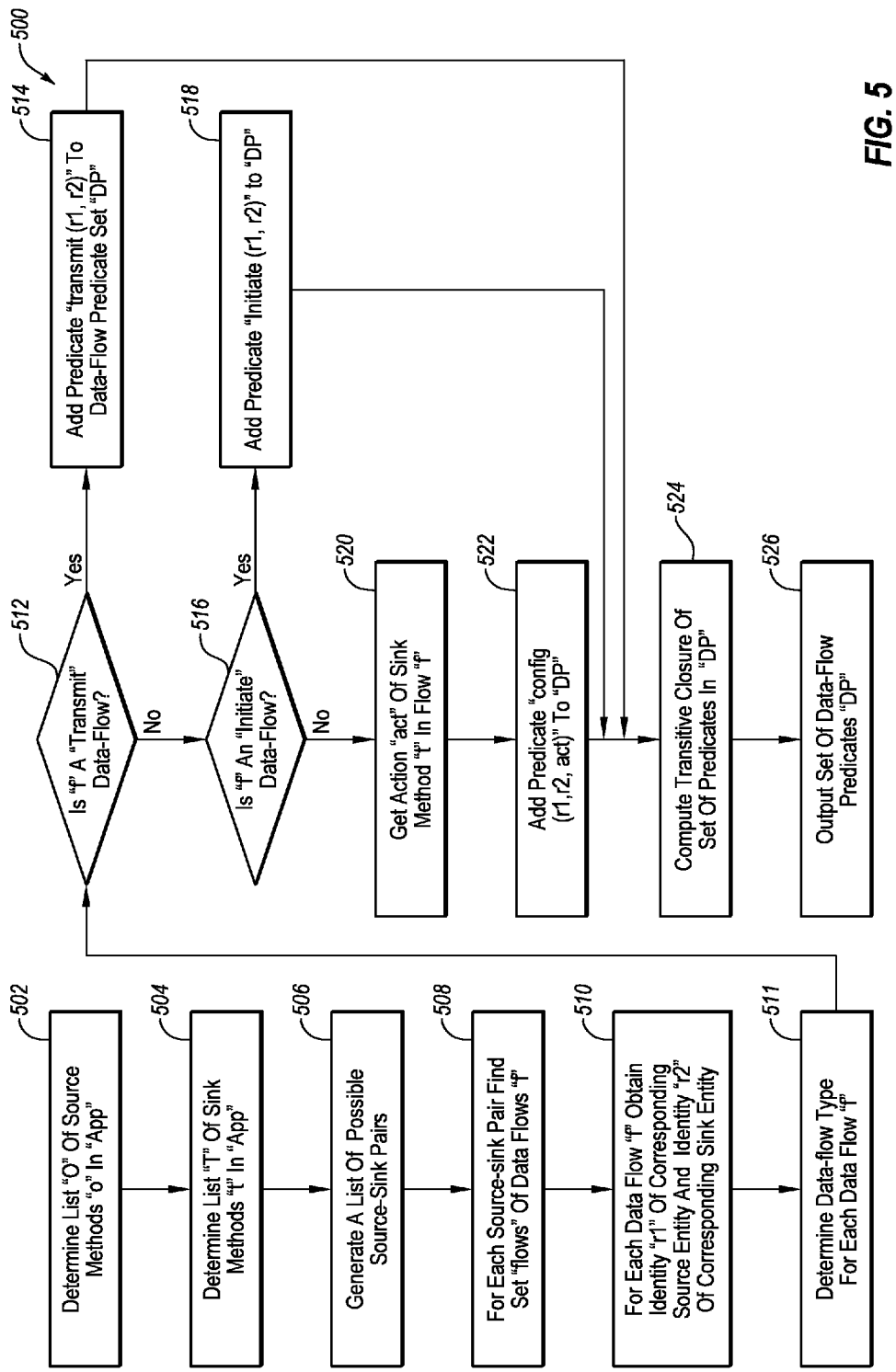
FIG. 5 is a flowchart of an example method of determining a set of data-flow predicates that may be satisfied by a software program.

FIG. 5 is a flowchart of an example method 500 of determining a set of data-flow predicates that may be satisfied by a software program, according to at least one embodiment described in the present disclosure. The method 500 may be performed by any suitable system, apparatus, or device. For example, the analysis module 106 of FIG. 1 or the computing system 202 (as directed by an analysis module) may perform one or more of the operations associated with the method 500. Additionally, the method 500 may be performed with respect to block 310 of method 300 described with respect to FIG. 3 in some embodiments. In the present disclosure, the method 500 is described with respect to the code under test "App" of the software program described with respect to FIG. 3. Although illustrated with discrete blocks, the steps and operations associated with one or more of the blocks of the method 500 may be divided into additional blocks, combined into fewer blocks, or eliminated, depending on the desired implementation.

The method 500 may begin at block 502, where a list "O" of source methods "o" included in the source code of "App" may be extracted from "App." In some embodiments, all the source methods may be extracted from "App." In some embodiments, the list "O" of source methods of "App" may be determined from a source method list "SO" that may be included in the analysis library, which may be read in at block 302 of FIG. 3, in some embodiments. For example, the source code of "App" may be parsed and compared with the source method list "SO" of the analysis library. In response to a particular method of "App" matching a particular source method "so" of the source method list "SO," the particular method may be added to the source list "O" as a source method "o."

At block 504, a list "T" of sink methods "t" included in the source code of "App" may be extracted from "App." In some embodiments, all the sink methods may be extracted from "App." In some embodiments, the list "T" of sink methods of "App" may be determined from a sink method list "SI" that may be included in the analysis library. For example, the source code of "App" may be parsed and compared with the sink method list "SI" of the analysis library. In response to a particular method of "App" matching a particular sink method "si" of the sink method list "SI," the particular method may be added to the sink list "T" as a sink method "t."

At block 506, a list of possible source-sink pairs may be generated from the source list "O" and the sink list "T." For example, each source method "o" may be paired with each sink method "t" to generate the list of source-sink pairs.

At block 508, a data flow set "flows" of data flows "f" may be determined for each source-sink pair using any suitable technique. For example, in some embodiments, the data flow set "flows" may be determined based on a static "taint-analysis" in some embodiments.

At block 510, a source entity identity "r1" and a sink entity identity "r2" may be determined for each data flow "f" in each set "flows." The source entity identity "r1" may include the identity of the external entity that may be the source of data ("source entity") with respect to the corresponding flow "f." The sink entity identity "r2" may include the identity of the external entity that may be the target of data ("sink entity") with respect to the corresponding flow "f." In some embodiments, the source entity identity "r1" and the sink entity identity "r2" may be identified from the I/O class objects that may correspond to the source and sink methods of the corresponding flow "f" and from the identities of the external entities associated with these I/O objects, as determined by the method 400 described with respect to FIG. 4.

At block 511, a data-flow type may be determined for each data flow "f." In some embodiments, the determination may be made based on the analysis library. This type determination may lead to each flow being designated as one of several data-flow types (e.g., "transmit," "initiate," or "config"). To perform this classification, the source and sink methods of the corresponding data flow "f" may be noted and the argument of the sink method into which the corresponding data flow "f" may flow may be noted. If the corresponding data flow "f" flows into certain arguments of certain sink methods (e.g., those used to configure the behavior of the method) it may be designated as "config" type of flow. Alternatively, if the corresponding data flow "f" flows into some other sink methods (e.g., those that are used to initialize or create external entity objects) it may be designated as an "initiate" type flow. Otherwise, the corresponding data flow "f" may be designated a "transmit" type flow. Note that blocks 512, 514, 516, 518, 520, and 522 described in the present disclosure may be performed with respect to each data flow "f." As such, reference to a data flow "f" with respect to blocks 512, 514, 516, 518, 520, and 522 may refer to any one of the data flows "f."

At block 512, it may be determined whether or not the data flow "f" is a "transmit" data flow. When the data flow "f" is a "transmit" data flow, the method 500 may proceed to block 514. When the data flow "f" is not a "transmit" data flow, the method 500 may proceed to block 516.

At block 514, a "transmit" data-flow predicate may be generated for the data flow "f" based on a corresponding source entity identity "r1" and a corresponding sink entity identity "r2." In some embodiments, the "transmit" data-flow predicate may be generated according to a configuration of the "transmit" data-flow predicate that may be included in the specification language. For example, the "transmit" data-flow predicate for the data flow "f" may be generated as follows with respect to the corresponding source entity identity "r1" and the corresponding sink entity identity "r2" of the data flow "f": "transmit (r1, r2)". In some embodiments, the "transmit" data-flow predicate may be added to a data-flow predicate set "DP" at block 514 also. Following block 514, the method 500 may proceed to block 524.

At block 516, it may be determined whether or not the data flow "f" is an "initiate" data flow. When the data flow "f" is an "initiate" data flow, the method 500 may proceed to block 518. When the data flow "f" is not an "initiate" data flow, the method 500 may proceed to block 520.

At block 518, an "initiate" data-flow predicate may be generated for the data flow "f" based on a corresponding source entity identity "r1" and a corresponding sink entity identity "r2." In some embodiments, the "initiate" data-flow predicate may be generated according to a configuration of the "initiate" data-flow predicate that may be included in the specification language. For example, the "initiate" data-flow predicate for the data flow "f" may be generated as follows with respect to the corresponding source entity identity "r1" and the corresponding sink entity identity "r2" of the data flow "f": "initiate (r1, r2)". In some embodiments, the "initiate" data-flow predicate may be added to the data-flow predicate set "DP" at block 518 also. Following block 518, the method 500 may proceed to block 524.

At block 520, an action "act" of the sink method "t" corresponding to the data flow "f" may be determined. In some embodiments, an action may be determined previously for each of the different sink methods in the sink method list "Sl" such that the action "act" of the sink method "t" may be determined based on to which sink method in "Sl" the sink method "t" may correspond.

At block 522, a "config" data-flow predicate may be generated for the data flow "f" based on the action "act," a corresponding source entity identity "r1" and a corresponding sink entity identity "r2." In some embodiments, the "config" data-flow predicate may be generated according to a configuration of the "config" data-flow predicate that may be included in the specification language. For example, the "config" data-flow predicate for the data flow "f" may be generated as follows with respect to the corresponding source entity identity "r1" and the corresponding sink entity identity "r2" of the data flow "f": "config (r1, r2, act)". In some embodiments, the "config" data-flow predicate may be added to the data-flow predicate set "DP" at block 522 also.

As indicated above, the operations associated with one or more of blocks 512, 514, 516, 518, 520, and 522 may be performed with respect to each data flow "f" to generate the data-flow predicate set "DP." A block 524, a transitive closure may be performed with respect to the data-flow predicates included in the data-flow predicate set "DP." The transitive closure may be performed to infer additional data-flow predicates that may be satisfied by "App" based on the data-flow predicates that were found using operations associated with one or more of blocks 512, 514, 516, 518, 520, and 522. Additionally, the data-flow predicates that may be inferred based on the transitive closure may be added to the data-flow predicate set "DP" at block 524.

In some embodiments, the transitive closure operation may be performed by transitively chaining two data-flow predicates such as p1(s1, t1), where s1 is the source of p1 and t1 is its sink, and p2(s2, t2), where s2 is the source of p2 and t2 is its sink, into predicate p3(s1, t2), if and only if t1 is the same as s2. As such, the first flow p1 may terminate in the sink from where the second flow p2 may originate. In this manner, a series of "transmit" flows may be chained to give a "transmit*" predicate, a series of "transmit" flows followed by a "initiate" flow may yield an "initiate*" predicate, and a series of "transmit" flows followed by a "config" flow may yield a "config*" predicate. The designation with the "*" may indicate that the corresponding predicates may be determined and inferred based on the transitive closure operations.

At block 526, the data-flow predicate set "DP" may be output. In some embodiments, the data-flow predicate set "DP" may be output such that the data-flow predicates included therein may be used for comparison and analysis at block 314 of method 300, as described above.

Accordingly, the method 500 may be used to determine data-flow predicates that may be satisfied by a software program. Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
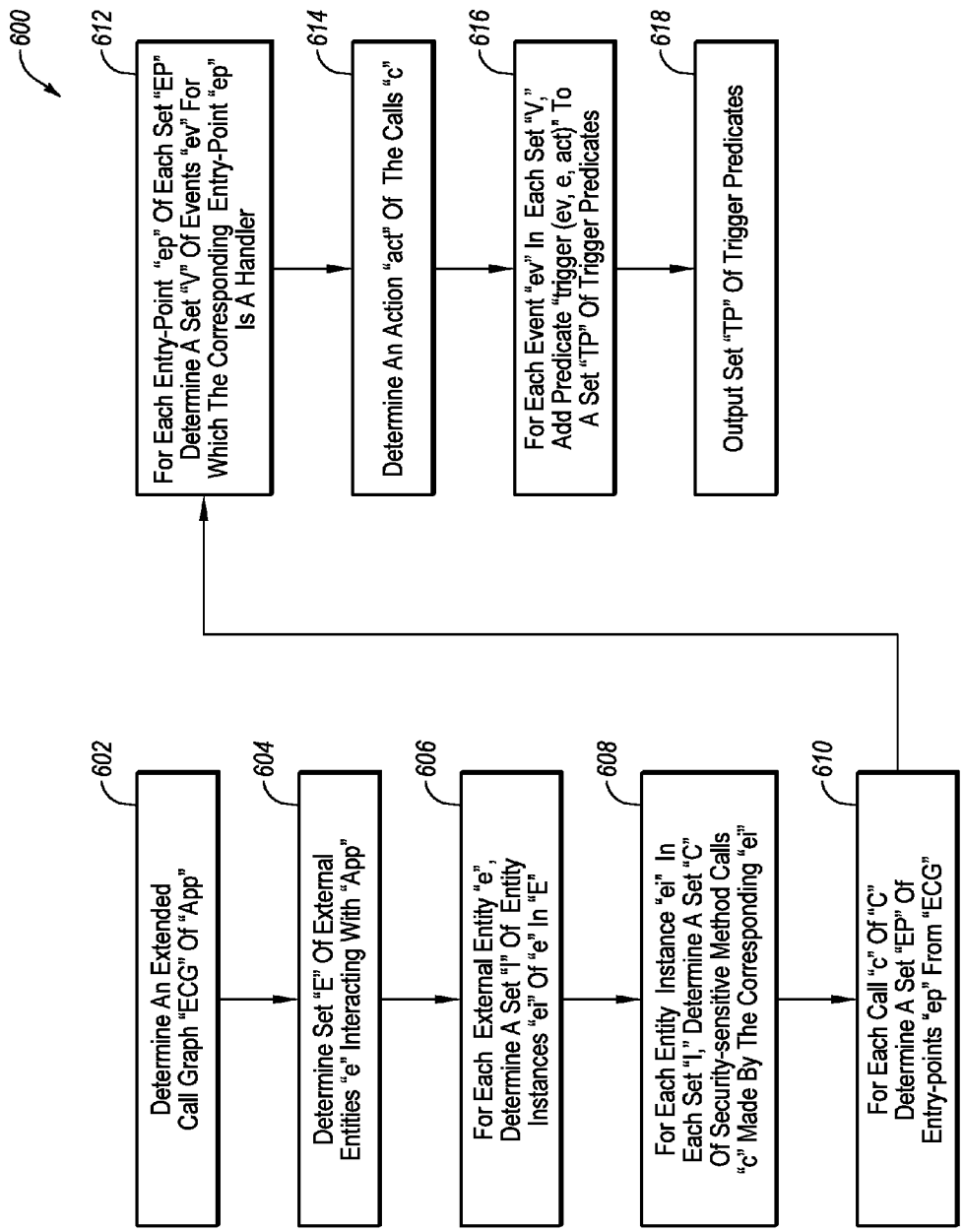
FIG. 6 is a flowchart of an example method of determining a set of "trigger" control-flow predicates that are satisfied by a software program.

FIG. 6 is a flowchart of an example method 600 of determining a set of "trigger" control-flow predicates that may be satisfied by a software program, according to at least one embodiment described in the present disclosure. The method 600 may be performed by any suitable system, apparatus, or device. For example, the analysis module 106 of FIG. 1 or the computing system 202 (as directed by an analysis module) may perform one or more of the operations associated with the method 600.

Because the "trigger" predicates may be included with control-flow predicates, the method 600 may be performed with respect to block 312 of method 300 described with respect to FIG. 3 in some embodiments. In the present disclosure, the method 600 is described with respect to the code under test "App" of the software program described with respect to FIG. 3. Although illustrated with discrete blocks, the steps and operations associated with one or more of the blocks of the method 600 may be divided into additional blocks, combined into fewer blocks, or eliminated, depending on the desired implementation.

The method 600 may begin at block 602, where an extended call graph "ECG" of "App" may be determined. The extended call graph "ECG" may be similar to a call graph in that it may represent and indicate calling relationships between functions in "App." The extended call graph may differ from other call graphs in that it may indicate not only explicit calling relationships between functions that may be explicitly indicated in the source code of "App," but may also indicate implicit relationships that indicate which function (an event-handler) is called in response to a given event initiated by the user (through the user interface of App) or by the runtime system that may not be explicitly indicated in the source code of "App." Further discussion and description of determining an extended call graph may be found in the paper entitled "AppContext: Differentiating Malicious and Benign Mobile App Behaviors Using Context" by Wei Yang, et al., the entire contents of which are incorporated by reference in the present disclosure.

At block 604, a set "E" of external entities "e" that may interface with "App" may be determined. In some embodiments, the external entities "e" may be included in the set "E" according to their identities, which may be determined according to one or more operations of method 400 as described above in some instances.

At block 606, a set "I" of entity instances "ei" may be determined for each external entity "e" that may be included in the set "E." In some embodiments, the set "I" may also be determined according to one or more operations of method 400 described above.

At block 608, a set "C" of security sensitive method calls "c" may be determined for each entity instance "ei" in each set "I." The security sensitive method calls "c" may be calls that may be made by the entity instances "ei" and that may initiate security sensitive operations of the software program. For example, in some embodiments, security sensitive operations may include read/write operations for which the runtime (e.g., in mobile platforms) may institute specific permissions/privileges that a software program may need to have before it is allowed to perform them. For instance, sending SMSs, reading a user's contact list, connecting to an external network location, etc. may qualify as being security sensitive.

At block 610, a set "EP" of entry points "ep" may be determined for each call "c" of each set "C." The entry points "ep" may include event handler functions whose execution eventually lead to the call "c." In some embodiments, the sets "EP" of entry points "ep" may be determined from the extended call graph "ECG" by analyzing the "ECG" and identifying the source nodes of paths leading to the node corresponding to "c" in the "ECG."

At block 612, a set "V" of events "ev" may be determined for each entry point "ep" of each set "EP." The events "ev" of a particular set "V" may include those events that may be handled by the event-handler function corresponding to the entry point node "ep." In some embodiments, the events "ev" may also be determined from the extended call graph "ECG." The particular target external entity may be a particular external entity "e" associated with a particular entity instance "ei" on which a particular call "c" is made.

At block 614, an action "act" may be determined for each of the calls "c." In some embodiments, an action may be determined previously for different security sensitive method calls such that the action "act" of a corresponding method call "c" may be determined based on to which security sensitive method call the corresponding method call "c" may correspond.

At block 616, a "trigger" control-flow predicate may be generated for each event "ev" that may be included in each set "V." In some embodiments, the "trigger" control-flow predicate may be generated according to a configuration of the "trigger" control-flow predicate that may be included in the specification language.

For example, the "trigger" control-flow predicate for each triggering event "ev" may be generated as follows: "trigger (ev, e, act)," in which "ev" may indicate the triggering event "ev"; "e" may indicate the corresponding target external entity "e" (e.g., "e" may include the identity of the external entity); and "act" may indicate the action "act" that may correspond to call "c" that may be associated with an entity instance "ei" that corresponds to the target external entity "e." In some embodiments, the "trigger" control-flow predicates may be added to a set "TP" of "trigger" control-flow predicates" at block 616 also.

At block 618, the "trigger" control-flow predicate set "TP" may be output. In some embodiments, the "trigger" control-flow predicate set "TP" may be output such that the "trigger" control-flow predicates included therein may be used for comparison and analysis at block 314 of method 300, as described above.

Accordingly, the method 600 may be used to determine "trigger" control-flow predicates that may be satisfied by a software program. Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 7:
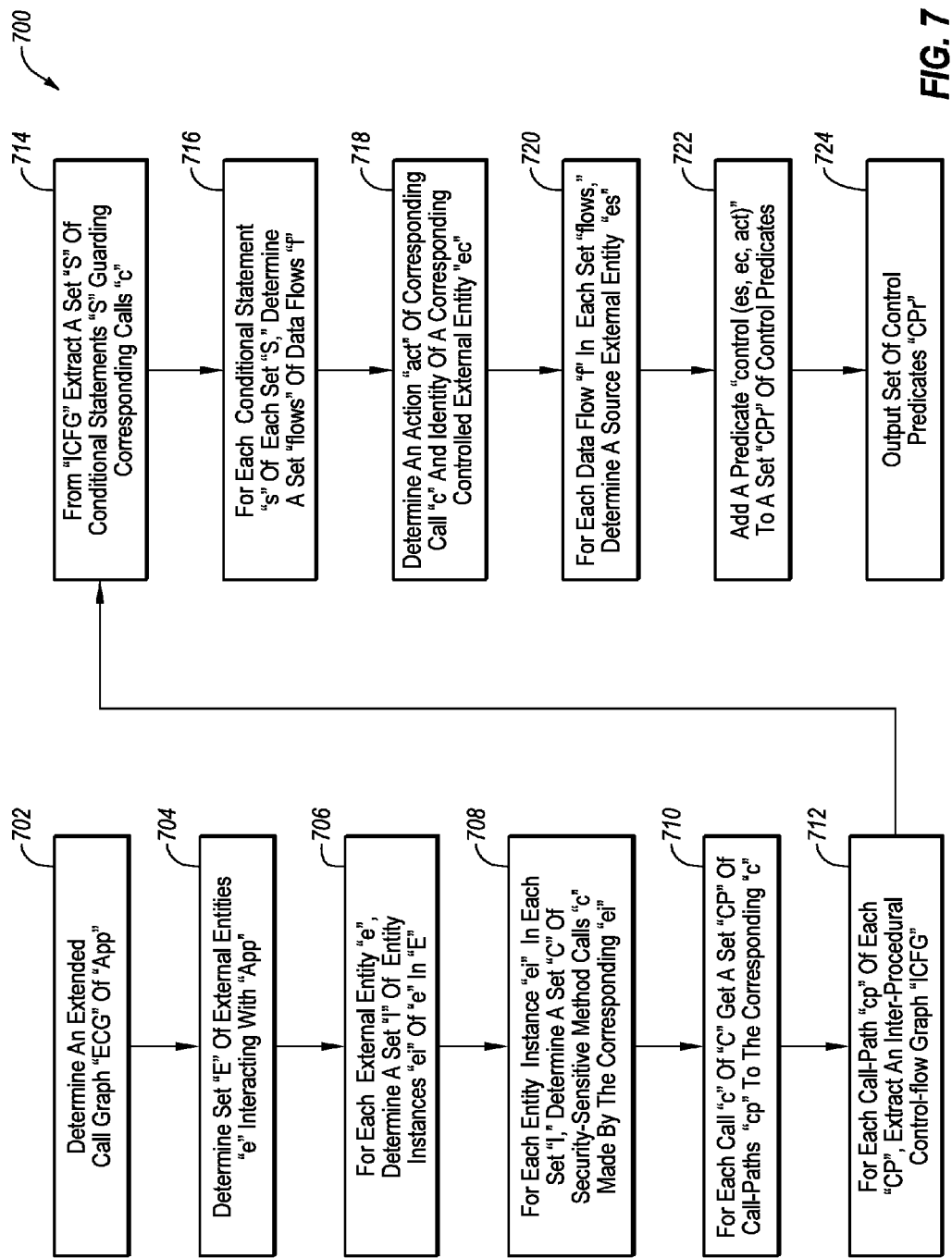
FIG. 7 is a flowchart of an example method of determining a set of "control" control-flow predicates that are satisfied by a software program.

FIG. 7 is a flowchart of an example method 700 of determining a set of "control" control-flow predicates that may be satisfied by a software program, according to at least one embodiment described in the present disclosure. The method 700 may be performed by any suitable system, apparatus, or device. For example, the analysis module 106 of FIG. 1 or the computing system 202 (as directed by an analysis module) may perform one or more of the operations associated with the method 700.

Because the "control" predicates may be included with control-flow predicates, the method 700 may be performed with respect to block 312 of method 300 described with respect to FIG. 3 in some embodiments. In the present disclosure, the method 700 is described with respect to the code under test "App" of the software program described with respect to FIG. 3. Although illustrated with discrete blocks, the steps and operations associated with one or more of the blocks of the method 700 may be divided into additional blocks, combined into fewer blocks, or eliminated, depending on the desired implementation.

The method 700 may begin at block 702, where an extended call graph "ECG" of "App" may be determined. The extended call graph "ECG" may be determined such as described with respect to block 602 of method 600.

At block 704, a set "E" of external entities "e" that may interface with "App" may be determined. In some embodiments, the external entities "e" may be included in the set "E" according to their identities, which may be determined according to one or more operations of method 400 as described above in some instances. The operations at block 704 may be analogous to those performed with respect to block 604 of the method 600.

At block 706, a set "I" of entity instances "ei" may be determined for each external entity "e" that may be included in the set "E." In some embodiments, the set "I" may also be determined according to one or more operations of method 400 described above. The operations at block 706 may be analogous to those performed with respect to block 606 of the method 600.

At block 708, a set "C" of security sensitive method calls "c" may be determined for each entity instance "ei" in each set "I." The security sensitive method calls "c" may be calls that may be made on or by the entity instances "ei" and that may initiate security sensitive operations of the software program. The operations at block 708 may be analogous to those performed with respect to block 608 of the method 600.

At block 710, a set "CP" of call paths "cp" may be determined for each call "c" of each set "C." Each of the call paths "cp" may correspond to a path in the "ECG" from some source node to the node in the "ECG" denoting the corresponding call "c" Thus, a particular call path may indicate a particular method call sequence, starting with the execution of some event-handler and eventually leading to a corresponding method "c" being invoked. In some embodiments, the sets "CP" of call paths "cp" may be determined from the extended call graph "ECG."

At block 712, an inter-procedural control flow graph "ICFG" may be determined for each call path "cp" of each set "CP." An inter-procedural control-flow graph (ICFG) corresponding to a specific call path "cp" (e.g., a specific sequence of method calls) may represent the control-flow structure of the corresponding sequence of method calls as the execution proceeds from one method call to the next. The ICFG may be constructed for each call path "cp" by taking the control-flow graphs for each method call in the corresponding call path "cp" and connecting the control-flow graphs for each consecutive pair of functions (e.g., c1 and c2) in the corresponding call path "cp", by an edge that connects the node corresponding to a corresponding call-site (e.g., a corresponding statement) of c2 in c1's control-flow graph with the source node of c2's control flow graph.

At block 714, a set "S" of conditional statements "s" may be determined from the inter-procedural control flow graphs that may be determined at block 712. In some embodiments, a different set "S" may be determined from each inter-procedural control flow graph "ICFG," in which the conditional statements "s" included in a particular set "S" may guard the call "c" that corresponds to the call path "cp" from which the associated inter-procedural control flow graph "ICFG" may be determined. This may be done by including any conditional statement "s" which lies on a path from a source node to the call-site for the call "c", in an ICFG being analyzed in this context. A particular conditional statement "s" may guard a corresponding call "c" when the call "c" may be influenced by the evaluation of the particular conditional statement "s." For example, the call "c" may or may not be made based on whether the conditional statement evaluates to "true" or "false" during the execution. The specific determination of whether the "true" evaluation of the conditional statement enables the call "c" or the "false" evaluation may not be necessary in some instances.

At block 716, a set "flows" of data-flows "f" may be determined for each conditional statement "s" of each set "S." In some embodiments, each of the data-flows "f" may originate in some source method from the source method list "SO" and terminate in the conditional statement "s".

At block 718, an action "act" may be determined for each of the calls "c." Additionally, for each of the calls "c," the identity of the target external entity "ec" that may correspond to the call "c" may be determined at block 718. The target external entity "ec" may include the external entity to or through which the corresponding call "c" may be made.

At block 720, a controlling external entity "es" may be determined for each flow "f" of each set "flows." In some embodiments, the controlling external entity "es" of a corresponding flow "f" may be determined based on the identity of a source entity of the corresponding flow "f" (such as the described with respect to method 500) in which the source entity is determined to be the controlling external entity.

At block 722, a "control" control-flow predicate may be generated for each call "f" that may be included in each set "flows." In some embodiments, the "control" control-flow predicate may be generated according to a configuration of the "control" control-flow predicate that may be included in the specification language.

For example, the "control" control-flow predicate for each data-flow "f" may be generated as follows: "control (es, ec, act)," in which "es" may indicate the controlling external entity that may be derived from the corresponding data flow "f"; "ec" may indicate the target external entity that may correspond to the call "c" that may be guarded by the conditional statement "s" based on which the corresponding data flow "f" may be determined; and "act" may indicate the action "act" that may correspond to the call "c" that may be guarded by the conditional statement "s" from which the corresponding data flow "f" may be determined. In some embodiments, the "control" control-flow predicates may be added to a set "CPr" of "control" control-flow predicates" at block 722 also.

At block 724, the "control" control-flow predicate set "CPr" may be output. In some embodiments, the "control" control-flow predicate set "CPr" may be output such that the "control" control-flow predicates included therein may be used for comparison and analysis at block 314 of method 300, as described above.

Accordingly, the method 700 may be used to determine "control" control-flow predicates that may be satisfied by a software program. Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A machine-implemented method comprising:
    determining, from source code of a software program, a set of entity instances in the software program, each entity instance in the set of entity instances corresponding to a program entity through which the software program performs an interaction with an external entity that is external to the software program;
    determining, from the source code, an identity of each external entity associated with the set of entity instances;
    determining, from the source code, a set of data-flow predicates that are satisfied by the software program and that each indicate a data flow of information between two or more external entities through the software program, the set of data-flow predicates being determined based on a signature specification language that includes a syntax that specifies command-and-control behavior of malicious software, the set of entity instances, and the identity of each external entity associated with the set of entity instances, the determining of the set of data-flow predicates including;
        determining a list of source methods of the software program that use one or more of the external entities as a source of data;
        determining a list of sink methods of the software program that use one or more of the external entities as a sink of data;
        determining a set of data flows from the list of source methods and the list of sink methods;
        determining, for each data flow of the set of data flows, a source entity identity and a sink entity identity based on a corresponding source method of a corresponding information flow and based on a corresponding sink method of the corresponding information flow;
        determining, for each data flow, a data flow type that indicates a purpose of the corresponding data flow; and
        determining a data-flow predicate for each data flow based on a corresponding data flow type, a corresponding source entity identity and a corresponding sink entity identity;
    determining, from the source code, a set of control-flow predicates that are satisfied by the software program and that indicate control of behavior of the software program with respect to one or more external entities, the set of control-flow predicates being determined based on the signature specification language, the set of entity instances, and the identity of each external entity associated with the set of entity instances;
    comparing the set of data-flow predicates and the set of control-flow predicates with a signature library that includes one or more malicious software signatures; and
    determining that the software program is malicious in response to the set of data-flow predicates and the set of control-flow predicates matching one or more malicious software signatures included in the signature library.

2. The method of claim 1, wherein determining the set of entity instances is based on a list of entity initialization methods.

3. The method of claim 1, wherein determining the identity of each external entity comprises:
    determining an entity initialization for a particular entity instance of the set of entity instances;
    determining an identity parameter of the entity initialization; and
    determining the identity of a particular external entity that corresponds to the particular entity instance based on the identity parameter.

4. The method of claim 1, wherein the set of data-flow predicates includes one or more data-flow predicates of one or more of the following types that each indicate a purpose of the corresponding data flow: a transmit type data-flow predicate, an initiate type data-flow predicate, and a config type data-flow predicate.

5. The method of claim 1, wherein the set of control-flow predicates includes one or more control-flow predicates of one or more of the following types: a trigger type control-flow predicate and a control type control-flow predicate.

6. The method of claim 1, wherein the one or more malicious software signatures are determined based on the signature specification language.

7. The method of claim 1, wherein determining the set of control-flow predicates includes determining one or more trigger type control-flow predicates that each indicate one or more events of the software program that trigger behavior of the software program associated with an external entity.

8. The method of claim 1, wherein determining the set of control-flow predicates includes determining one or more control type control-flow predicates that each indicate a controlling external entity, a target external entity, and an action of the target external entity, wherein a first interaction of the controlling external entity with the software program directs a second interaction of the software program with the target external entity and wherein performance of the action by the target external entity is in response to the second interaction as directed by the controlling external entity through the software program via the first interaction.

9. The method of claim 1, wherein the syntax includes a list of one or more of the following that express command-and-control behaviors: entity types, action types, event types, data-flow predicates, and control-flow predicates.

10. Non-transitory computer-readable storage media including computer-executable instructions configured to cause a system to perform operations, the operations comprising:

determining, from source code of a software program, a set of entity instances in the software program, each entity instance in the set of entity instances corresponding to a program entity through which the software program performs an interaction with an external entity that is external to the software program;

determining, from the source code, an identity of each external entity associated with the set of entity instances;

determining, from the source code, a set of data-flow predicates that are satisfied by the software program and that each indicate a data flow of information between two or more external entities through the software program, the set of data-flow predicates being determined based on a signature specification language that includes a syntax that specifies command-and-control behavior of malicious software, the set of entity instances, and the identity of each external entity associated with the set of entity instances, the determining of the set of data-flow predicates including;

determining a list of source methods of the software program that use one or more of the external entities as a source of data;

determining a list of sink methods of the software program that use one or more of the external entities as a sink of data;

determining a set of data flows from the list of source methods and the list of sink methods;

determining, for each data flow of the set of data flows, a source entity identity and a sink entity identity based on a corresponding source method of a corresponding information flow and based on a corresponding sink method of the corresponding information flow;

determining, for each data flow, a data flow type that indicates a purpose of the corresponding data flow; and determining a data-flow predicate for each data flow based on a corresponding data flow type, a corresponding source entity identity and a corresponding sink entity identity;

determining, from the source code, a set of control-flow predicates that are satisfied by the software program and that indicate control of behavior of the software program with respect to one or more external entities, the set of control-flow predicates being determined based on the signature specification language, the set of entity instances, and the identity of each external entity associated with the set of entity instances;

comparing the set of data-flow predicates and the set of control-flow predicates with a signature library that includes one or more malicious software signatures; and determining that the software program is malicious in response to the set of data-flow predicates and the set of control-flow predicates matching one or more malicious software signatures included in the signature library.

11. The non-transitory computer-readable storage media of claim 10, wherein determining the set of entity instances is based on a list of entity initialization methods.

12. The non-transitory computer-readable storage media of claim 10, wherein determining the identity of each external entity comprises:

determining an entity initialization for a particular entity instance of the set of entity instances;

determining an identity parameter of the entity initialization; and determining the identity of a particular external entity that corresponds to the particular entity instance based on the identity parameter.

13. The non-transitory computer-readable storage media of claim 10, wherein the set of data-flow predicates includes one or more data-flow predicates of one or more of the following types that each indicate a purpose of the corresponding data flow: a transmit type data-flow predicate, an initiate type data-flow predicate, and a config type data-flow predicate.

14. The non-transitory computer-readable storage media of claim 10, wherein the set of control-flow predicates includes one or more control-flow predicates of one or more of the following types: a trigger type control-flow predicate and a control type control-flow predicate.

15. The non-transitory computer-readable storage media of claim 10, wherein the one or more malicious software signatures are determined based on the signature specification language.

16. The non-transitory computer-readable storage media of claim 10, wherein determining the set of control-flow predicates includes determining one or more trigger type control-flow predicates that each indicate one or more events of the software program that trigger behavior of the software program associated with an external entity.

17. The non-transitory computer-readable storage media of claim 10, wherein determining the set of control-flow predicates includes determining one or more control type control-flow predicates that each indicate a controlling external entity, a target external entity, and an action of the target external entity, wherein a first interaction of the controlling external entity with the software program directs a second interaction of the software program with the target external entity and wherein performance of the action by the target external entity is in response to the second interaction as directed by the controlling external entity through the software program via the first interaction.

18. The non-transitory computer-readable storage media of claim 10, wherein the syntax includes a list of one or more of the following that express command-and-control behaviors: entity types, action types, event types, data-flow predicates, and control-flow predicates.

* * * * *